United States Patent
Yoshida et al.

(10) Patent No.: US 9,507,782 B2
(45) Date of Patent: Nov. 29, 2016

(54) DYNAMIC CONTENT PREVIEW

(75) Inventors: Naofumi Yoshida, Yokohama (JP);
Shuichi Kurabayashi, Fujisawa (JP);
Kosuke Takano, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 408 days.

(21) Appl. No.: 13/814,654

(22) PCT Filed: Aug. 14, 2012

(86) PCT No.: PCT/US2012/050726
§ 371 (c)(1),
(2), (4) Date: Feb. 6, 2013

(87) PCT Pub. No.: WO2014/027999
PCT Pub. Date: Feb. 20, 2014

(65) Prior Publication Data
US 2014/0052741 A1 Feb. 20, 2014

(51) Int. Cl.
*G06F 17/30* (2006.01)

(52) U.S. Cl.
CPC ... *G06F 17/30067* (2013.01); *G06F 17/30056* (2013.01)

(58) Field of Classification Search
CPC .................................. G06F 17/30864
USPC ........................................ 707/749
See application file for complete search history.

(56) References Cited

U.S. PATENT DOCUMENTS

| | | | |
|---|---|---|---|
| 7,712,034 B2 * | 5/2010 | Gusmorino et al. | 715/746 |
| 8,032,482 B2 * | 10/2011 | Rosenberg et al. | 707/602 |
| 8,305,354 B2 * | 11/2012 | Lin et al. | 345/173 |
| 8,554,720 B2 * | 10/2013 | Liu et al. | 707/608 |
| 8,738,390 B1 * | 5/2014 | Price | 705/1.1 |
| 2006/0235855 A1 | 10/2006 | Rousseau et al. | |
| 2009/0066722 A1 | 3/2009 | Kriger et al. | |
| 2009/0171918 A1 | 7/2009 | Manber et al. | |
| 2010/0257177 A1 * | 10/2010 | Yamamoto | 707/741 |
| 2011/0043869 A1 | 2/2011 | Okajo | |

(Continued)

FOREIGN PATENT DOCUMENTS

| | | |
|---|---|---|
| CN | 1741004 | 3/2006 |
| CN | 101243428 | 2/2008 |

(Continued)

OTHER PUBLICATIONS

"Blur filters," accessed at http://web.archive.org/web/20120215045802/http://help.adobe.com/en_US/photoshop/cs/using/WSfd1234e1c4b69f30ea53e41001031ab64-796ea.html, accessed on Aug. 10, 2014, 1 page.

(Continued)

*Primary Examiner* — Rehana Perveen
*Assistant Examiner* — Hicham Skhoun
(74) *Attorney, Agent, or Firm* — Brundidge & Stanger, P.C.

(57) ABSTRACT

Technologies are generally described for generating a preview of a content file dynamically based at least in part on content features of the content file. In some examples, a content preview system may include a content feature analysis unit configured to analyze one or more content features of a content file, and a preview type determination unit configured to determine a preview type for the content file based at least in part on the content features analyzed by the content feature analysis unit.

20 Claims, 6 Drawing Sheets

(56) References Cited

U.S. PATENT DOCUMENTS

| | | |
|---|---|---|
| 2011/0173188 A1 | 7/2011 | Walsh et al. |
| 2012/0054600 A1* | 3/2012 | McCurdy .......... G06F 17/30268 715/243 |
| 2013/0145244 A1* | 6/2013 | Rothschiller et al. ........ 715/212 |
| 2013/0222299 A1* | 8/2013 | Heo et al. ..................... 345/173 |
| 2014/0025650 A1* | 1/2014 | Lee et al. ...................... 707/694 |

FOREIGN PATENT DOCUMENTS

| | | |
|---|---|---|
| CN | 101542486 | 9/2009 |
| CN | 103026331 A | 4/2013 |
| EP | 1630694 | 3/2006 |
| WO | 2007022047 A2 | 2/2007 |
| WO | 2008067116 | 6/2008 |
| WO | 2011162959 A2 | 12/2011 |

OTHER PUBLICATIONS

"My Voice," accessed at http://web.archive.org/web/20120716031139/http://www.myvoice.co.jp/biz/surveys/15617/index.html, accessed on Aug. 10, 2014, 3 pages.

"Photoshop / Filter effect reference," accessed at http://help.adobe.com/ja_JP/photoshop/cs/using/WSfd1234e1c4b69f30ea53e41001031ab64-7970a.html#WSfd1234e1c4b69f30ea53e41001031ab64-796ea, accessed on Sep. 10, 2014, 8 pages.

"Reasons for not using eBooks," accessed at http://web.archive.org/web/20120510071546/http://bizmakoto.jp/makoto/articles/1006/03/news008.html, accessed on Sep. 10, 2014, 9 pages.

"The survey when buying a book on information source," accessed at http://web.archive.org/web/20130512224248/http://koubo.jp/contents/release/20070801.html, published on Aug. 1, 2007, 5 pages.

Camp, L. J., "First principles of copyright for DRM design," Internet Computing, IEEE, vol. 7, No. 3, May 21, 2003, pp. 59-65.

Li, H., and Yamanishi, K., "Topic analysis using a finite mixture model," Proceedings of the 2000 Joint SIGDAT conference on Empirical methods in natural language processing and very large corpora, held in conjunction with the 38th Annual Meeting of the Association for Computational Linguistics , vol. 13, pp. 35-44 (2000).

Mitchell, A. A., "The dimensions of advertising involvement," Advance in Consumer Research, vol. 8, pp. 25-30 (1981).

Rice, S., "Own or rent? A survey of eBook licensing models," Against the Grain, 2006, vol. 18, Issue 3, 3 pages (2006).

Shelburne, W. A., "E-book usage in an academic library: User attitudes and behaviors," Library Collections, Acquisitions, and Technical Services, vol. 33, Issues 2-3, pp. 59-72, (2009).

Shen, X. et al. "Analysis of topic dynamics in web search," WWW '05 Special interest tracks and posters of the 14th international conference on World Wide Web, May 10-14, 2005, 2 pages.

International Search Report from International Application No. PCT/US12/50726 mailed Oct. 12, 2012.

http://www.realread.com/files/demo_magazines.html. "On-line Magazine Demos—Magazines at Click of a Mouse: RealRead Provides Fast, Affordable Methods for Online Publishing" dated Apr. 4, 2012, pp. 1-3.

\* cited by examiner

DYNAMIC CONTENT PREVIEW

CROSS-REFERENCE TO RELATED APPLICATION

This Application is a U.S. National Stage filing under 35 U.S.C. §371 of PCT Application Ser. No. PCT/US12/50726 filed on Aug. 14, 2012. The disclosure of the PCT Application is hereby incorporated herein by reference in its entirety.

BACKGROUND

Markets for electronic contents such as, for example, electronic books, digital videos, digital audios, games, etc. have experienced phenomenal growth in the last few years. Electronic book purchases, via an online bookstore, are growing in proportion relative to the purchase of physical books. The same is true regarding the purchase of music files via an online music shop.

To promote sales of the electronic contents, content providers provide previews for the electronic contents. For example, the content providers allow potential purchasers to read first few pages of an electronic book, or to listen first few seconds of a digital song.

SUMMARY

In an example, a content preview system may include a content feature analysis unit configured to analyze one or more content features of a content file, and a preview type determination unit configured to determine a preview type for the content file based at least in part on the content features analyzed by the content feature analysis unit.

In another example, a content server may include a database configured to store at least one of a content file, content information associated with the content file, and a purchase history of a user; a content feature analysis unit configured to analyze one or more content features of the content file, an information extraction unit configured to extract from the database at least one of the content information associated with the content file and the purchase history of the user; and a preview type determination unit configured to determine a preview type for the content file based at least in part on at least one of the content features analyzed by the content feature analysis unit, the content information extracted by the information extraction unit, and the purchase history extracted by the information extraction unit.

In yet another example, a method performed under control of a content preview system may include analyzing one or more content features of a content file, and determining a preview type for the content file based at least in part on the analyzed content features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
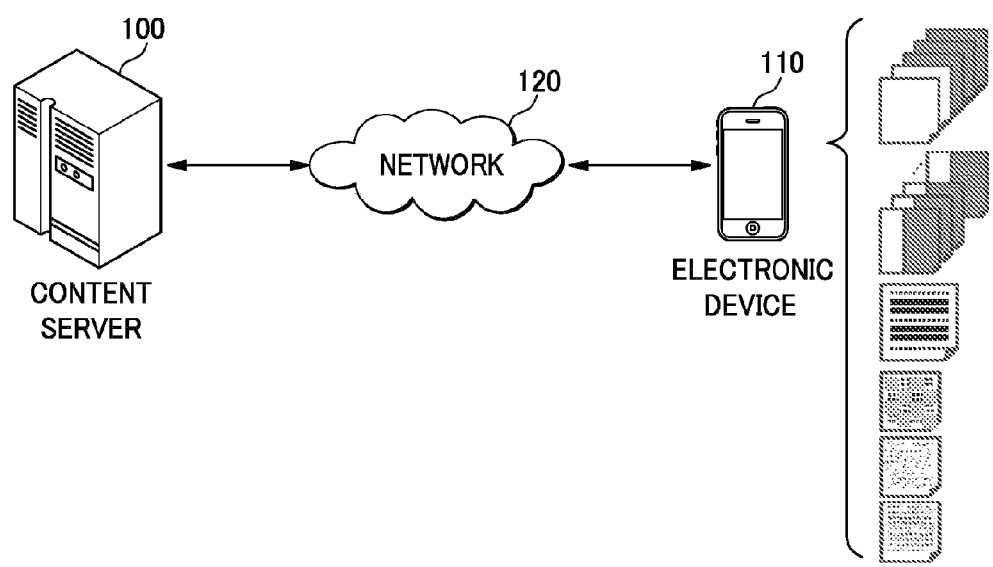
FIG. 1 schematically shows an illustrative example of an environment in which a content server provides an electronic device with a dynamic content preview, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a preview of an electronic content file such as, for example, an electronic book (i.e., e-book).

Technologies are generally described for generating a preview of a content file based at least in part on content features of the content file.

In some examples, a user may access an on-line electronic content store such as, for example, an electronic book store, to buy and/or download electronic contents such as, for example, an electronic book. A content provider may provide the user with previews of the electronic contents to promote sales of the electronic contents. The content store and/or the content provider may operate a content server including a database on which the electronic contents may be stored.

In some examples, a content preview system, which may be a component of the content server or be separate from, but still controlled by, the content server, may determine a preview type appropriate for a content file based at least in part on one or more content features of the content file. By way of example, but not limitation, when the content file is an electronic book, the content features of the content file may indicate whether the electronic book has a story structure, whether the electronic book has a dictionary-like structure, a ratio between text and images in the electronic book, a ratio between text and tables in the electronic book, and/or whether the electronic book is a specialty publication.

In some examples, the content preview system may select the preview type at least among a preview of a beginning of the electronic book, a preview of a portion of every page of the electronic book, a preview of a portion of sentences in the electronic book, a mosaic view of every page of the electronic book, an embossed view of every page of the electronic book, and/or a shaded view of every page of the electronic book, based at least in part on the content features.

By way of example, but not limitation, when the electronic book has a story structure, the content preview system may determine a preferred preview type for the content file to be the beginning of the electronic book. By way of example, but not limitation, when the electronic book has a dictionary-like structure, the content preview system may determine a preferred preview type for the content file to be a portion of every page of the electronic book such as, for example, a preview of a left-side or right-side portion of every page of the electronic book. By way of example, but not limitation, when the electronic book is a specialty publication, the content preview system may determine a preferred preview type for the content file to be a preview of a portion of sentences in the electronic book.

In some examples, the content preview system may determine an amount of the content file to be previewed to the user based at least in part on content information associated with the content file, such as customer review information regarding the content file and sales information regarding the content file, and/or a purchase history of the user. By way of example, but not limitation, the content preview system may reduce the amount of content previewed to a user as customer reviews of the content file increase. By way of example, but not limitation, the content preview system may increase the amount of content previewed as sales of the content file decrease. Further still, by way of example, but not limitation, the content preview system may increase the amount of content previewed as the user's purchases of other content files increase.

Then, in some examples, the content preview system may generate a preview of the content file based at least in part on the determined preview type and the amount of content to be previewed, and transmit the generated preview to the content server of the content store or provider. Then, the content server may transmit the preview content to a device of the user, so that the user may see the preview to determine whether to buy or not the content file.

FIG. 1 schematically shows an illustrative example of an environment in which a content server provides an electronic device with a dynamic content preview, arranged in accordance with at least some embodiments described herein.

As depicted, a content server 100 may provide content files to an electronic device 110 via a network 120. By way of example, but not limitation, content server 100 may be managed or operated by a content provider. Examples of electronic device 110 may include, but are not limited to, a tablet, a smartphone, a mobile phone, a personal digital assistant (PDA), an electronic book reader, a media player, a game console, a laptop computer, a desktop computer, or any other devices being able to access content server 100. Examples of network 120 may include, but are not limited to, a cellular network or a mobile network, a local area network (LAN), a backbone network, a metropolitan area network (MAN), a wide area network (WAN), a virtual private network (VPN), an internetwork, etc. Examples of the content files may include, but are not limited to, an electronic book file, an audio book file, a video file, a music file, a game file, etc.

For ease of explanation, the content file will be assumed as an electronic book hereinafter. However, those skilled in the art will recognize that the embodiments described herein may not be limited to the implementation of generating a preview of an electronic book, but be applied to any kind of electronic content file.

In some embodiments, when a user of electronic device 110 shows interest in one of electronic books stored in or provided by content server 100, and/or requests to view a preview of the electronic book, a content preview system may generate the preview of the electronic book. The content preview system may be a component of content server 100, or be separate from but still controlled by content server 100.

In some embodiments, the content preview system may analyze one or more content features of the electronic book. By way of example, but not limitation, the content features of the electronic book may indicate whether the electronic book has a story structure, whether the electronic book has a dictionary-like structure, a ratio between text and images in the electronic book, a ratio between text and tables in the electronic book, and/or whether the electronic book is a specialty publication.

In some embodiments, the content preview system may partition the electronic book into respective book elements (e.g., parts, chapters, pages, sentences, words, images and/or tables). In some embodiments, when the electronic book has been rendered by a desktop publishing (DTP) scheme, the content preview system may partition the electronic book using already available text strings. In some embodiments, when the electronic book has been rendered by scanning a paper book, the content preview system may partition the electronic book using digitized text strings extracted by using an optical character recognition (OCR) scheme.

In some embodiments, the content preview system may detect change of a frequency of occurrence of a word throughout the electronic book, and determine a story property of the electronic book based at least in part on the change of frequency of occurrence of the word. The story property may be defined as whether the electronic book has a story structure and/or to what extent the electronic book has such a story structure. By way of example, but not limitation, if the frequency of occurrence of at least a predetermined portion of words in the electronic book increases or decreases as the story develops from beginning to end of the electronic book, the electronic book may be considered as having a story structure. Table 1 below illustrates example frequency of occurrence of words in the electronic book.

TABLE 1

| Word | Part 1 (beginning) | Part 2 | ... | Part N (end) |
|---|---|---|---|---|
| Word 1 | 22% | 15% | ... | 5% |
| Word 2 | 5% | 0% | ... | 11% |
| ... | ... | ... | ... | ... |

In such cases, the content preview system may first detect the words the portion of which is greater than a predetermined threshold in Part 1 (i.e., in the beginning of the electronic book). By way of example, but not limitation, when the predetermined threshold is 20%, the content preview system may detect some words including Word 1. The content preview system may then determine whether the frequency of occurrence of each of the detected words decreases as the story develops to Part N (i.e., the end of the electronic book), such as Word 1 in Table 1. Then, the content preview system may calculate a portion of words in the electronic book, the frequency of occurrence of which decreases from Part 1 to Part N. Similarly, the content preview system may calculate a portion of words in the electronic book, the frequency of occurrence of which increases from Part 1 to Part N. Then, the content preview system may use the calculated portions as an indicator for the story property of the electronic book.

In some embodiments, the content preview system may calculate a ratio between text and images in the electronic book and/or a ratio between text and tables in the electronic book, and determine a separability property of the electronic book, which may be defined as a degree of importance of the respective book elements. By way of example, but not limitation, if the images and/or tables take up more than a predetermined portion of the electronic book as in an art book or a statistical book, the images and/or tables may be considered as important portions of the book. In such cases, the content preview system may determine the separability property of the electronic book based at least in part on a portion of images and/or tables in the electronic book.

In some embodiments, the content preview system may detect a repeated structure throughout the electronic book, and determine the separability property of the electronic book based thereon. By way of example, but not limitation, when the electronic book has a dictionary-like structure, the electronic book may have a repeated structure of a headword and a short description thereof. In such cases, the content preview system may determine the separability property of the electronic book based at least in part on an extent of appearance of the repeated structure.

In some embodiments, the content preview system may detect a frequency of occurrence of technical terms in the electronic book, and determine a specialty property of the electronic book based thereon. By way of example, but not limitation, the content preview system may compare the words in the electronic book with terms in glossaries in the fields of several areas of specialties, and determine the specialty property of the electronic book based at least in part on a portion of the words that match the terms in the glossaries.

Table 2 below illustrates example content features analyzed by the content preview system. Although the values of the respective properties are defined in the range of 0% to 100% in Table 2, those skilled in the art will recognize that the values may be scaled in a different way depending on the desired implementation.

TABLE 2

| Book ID | Story property | Separability property | Specialty property |
|---|---|---|---|
| Book 1 | 100 | 10 | 20 |
| Book 2 | 20 | 95 | 60 |
| ... | ... | ... | ... |

In some embodiments, the content preview system may determine a preview type for the content file based at least in part on the analyzed content features. By way of example, but not limitation, the content preview system may select the preview type at least among a preview of a beginning of the electronic book (e.g., beginning n % of the electronic book), a preview of a portion of every page of the electronic book (e.g., a left-side m % margin of every page of the electronic book), a preview of a portion of sentences in the electronic book (e.g., every s % of sentences in the electronic book), a mosaic view of every page of the electronic book, an embossed view of every page of the electronic book and a shaded view of every page of the electronic book, as shown in FIG. 1. Table 3 below illustrates example weight values for selecting the preview type appropriate for the content features.

TABLE 3

| Preview type | Story property | Separability property | Specialty property |
|---|---|---|---|
| Beginning n % | 1.0 | 0.1 | 0.1 |
| Left-side m % | 0.1 | 1.0 | 0.0 |
| s % of sentences | 0.1 | 0.5 | 0.9 |
| Mosaic view | 0.5 | 0.5 | 0.5 |
| Embossed view | 0.1 | 0.9 | 0.8 |
| Shaded view | 0.7 | 0.5 | 0.1 |
| ... | ... | ... | ... |

In some embodiments, the content preview system may determine the preview type by calculating relevancies for respective candidate preview types based at least in part on the values of the story property, separability property and specialty property in Table 2, and the weight values in Table 3. In such cases, the content preview system may calculate the relevancies using cross product of a matrix of the weight values in Table 3 and a vector of the values of the story property, separability property and specialty property in Table 2. By way of example, but not limitation, for Book 1 illustrated in Table 2, the relevancy for the beginning of the electronic book may be calculated as 103 (100×1.0+10×0.1+20×0.1), the relevancy for the portion of every page of the electronic book may be calculated as 20 (100×0.1+10×1.0+20×0.0), the relevancy for the portion of sentences in the electronic book may be calculated as 33 (100×0.1+10×0.5+20×0.9), the relevancy for the mosaic view may be calculated as 65 (100×0.5+10×0.5+20×0.5), the relevancy for the embossed view may be calculated as 35 (100×0.1+10×0.9+20×0.8), and the relevancy for the shaded view may be calculated as 77 (100×0.7+10×0.5+20×0.1). Since the relevancy for the beginning of the electronic book is the highest in this example, the content preview system may determine a preferred preview type for Book 1 to be the preview of the beginning of the electronic book.

In some embodiments, the content preview system may extract from a database content information associated with the content file including customer review information regarding the content file and sales information regarding the content file and/or a purchase history of the user. The database may be a component of content server 100, or be separate from but still controlled by content server 100.

Then, in some embodiments, the content preview system may determine an amount of content to be previewed (e.g., values of n, m and s in the above example), based at least in part on the content information and/or the purchase history. By way of example, but not limitation, the content preview system may reduce the amount of content to be previewed as customer reviews for the content file increase. By way of example, but not limitation, the content preview system may increase the amount of content to be previewed as sales of the content file decrease. By way of example, but not limitation, the content preview system may increase the amount of the content file to be previewed as the user's purchases of other content files increases. In some alternative embodiments, the content preview system may set the amount of preview as a constant value regardless of the content information and/or the purchase history.

Then, in some embodiments, the content preview system may generate a preview of the content file based at least in part on the determined preview type and amount of the content file to be previewed, for transmission to electronic device 110.

Figure 2:
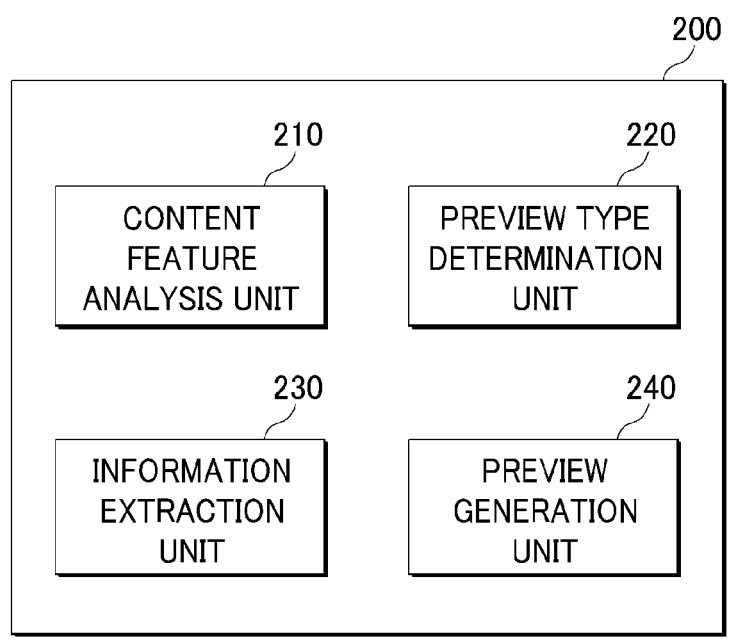
FIG. 2 shows a schematic block diagram illustrating an example architecture of a content preview system, arranged in accordance with at least some embodiments described herein.

FIG. 2 shows a schematic block diagram illustrating an example architecture of a content preview system, arranged in accordance with at least some embodiments described herein.

As depicted, a content preview system 200 may include a content feature analysis unit 210, a preview type determination unit 220, an information extraction unit 230 and a preview generation unit 240. Although illustrated as discrete components, various components may be divided into additional components, combined into fewer components, or eliminated while being contemplated within the scope of the disclosed subject matter.

Content feature analysis unit 210 may be configured to analyze one or more content features of a content file such as, for example, an electronic book. By way of example, but not limitation, the content features of the electronic book may indicate at least one of whether the electronic book has a story structure, whether the electronic book has a dictionary-like structure, a ratio between text and images in the electronic book, a ratio between text and tables in the electronic book, and whether the electronic book is a specialty publication.

In some embodiments, content feature analysis unit 210 may partition the electronic book into book elements (e.g., parts, chapters, pages, sentences, words, images and/or tables), and determine at least one of a story property, a separability property and a specialty property of the electronic book based at least in part on the book elements. By way of example, but not limitation, content feature analysis unit 210 may detect change of a frequency of occurrence of a word throughout the electronic book, calculate at least one of a ratio between text and images in the electronic book and a ratio between text and tables in the electronic book, detect a repeated structure throughout the electronic book, and/or detect a frequency of occurrence of technical terms in the electronic book.

Preview type determination unit 220 may be configured to determine a preview type for the content file based at least in part on the content features analyzed by content feature analysis unit 210. In some embodiments, preview type determination unit 220 may select the preview type at least among a preview of a beginning of the electronic book, a preview of a portion of every page of the electronic book, a preview of a portion of sentences in the electronic book, a mosaic view of every page of the electronic book, an embossed view of every page of the electronic book and a shaded view of every page of the electronic book.

Information extraction unit 230 may be configured to extract from a database at least one of content information associated with the content file and a purchase history of a user. By way of example, but not limitation, the content information may include customer review information regarding the content file and sales information regarding the content file.

In some embodiments, preview type determination unit 220 may be further configured to determine an amount of content to be previewed based at least in part on at least one of the content information and the purchase history, which may be extracted by information extraction unit 230.

Preview generation unit 240 may be configured to generate a preview of the content file based at least in part on the preview type determined by preview type determination unit 220.

Figure 3:
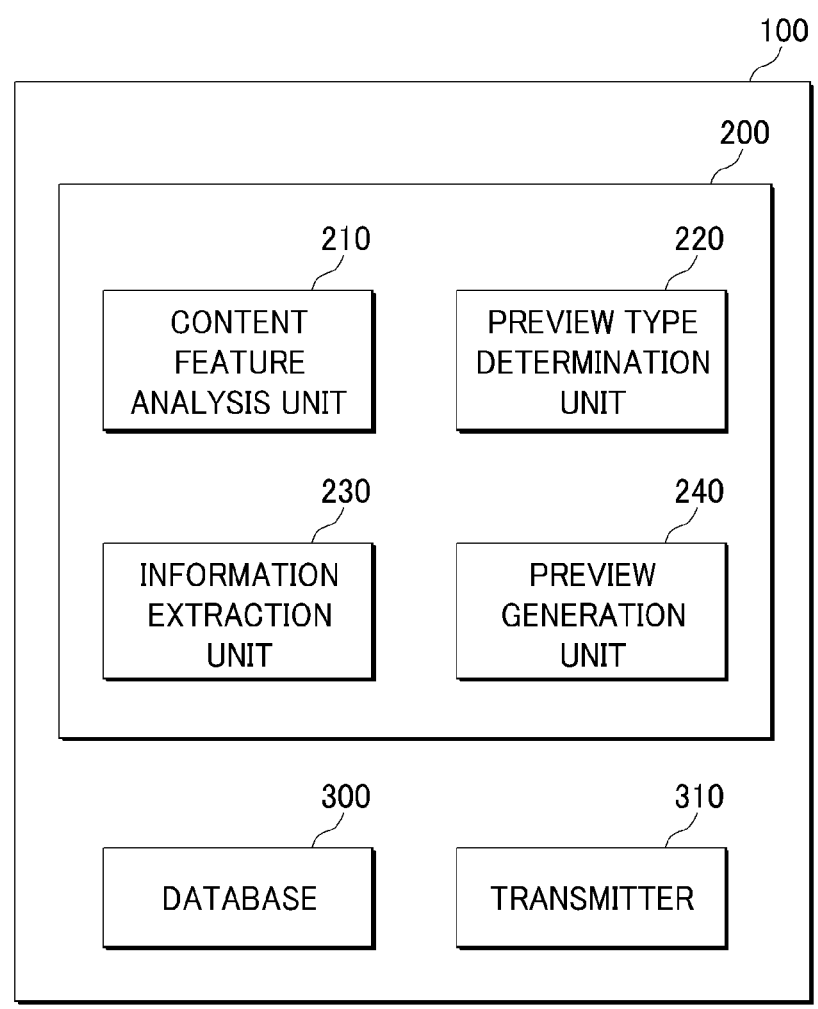
FIG. 3 shows a schematic block diagram illustrating an example architecture of a content server, arranged in accordance with at least some embodiments described herein.

FIG. 3 shows a schematic block diagram illustrating an example architecture of a content server, arranged in accordance with at least some embodiments described herein.

As depicted, content server 100 may include content preview system 200 including content feature analysis unit 210, preview type determination unit 220, information extraction unit 230 and preview generation unit 240, the details of which are described above with reference to FIG. 2. Content server 100 may further include a database 300 and a transmitter 310. Although illustrated as discrete components, various components may be divided into additional components, combined into fewer components, or eliminated while being contemplated within the scope of the disclosed subject matter.

Database 300 may be configured to store at least one of a content file, content information associated with the content file, and a purchase history of a user.

Content feature analysis unit 210 may be configured to analyze one or more content features of the content file stored in database 300.

Information extraction unit 230 may be configured to extract from database 300 at least one of the content information associated with the content file and the purchase history of the user.

Preview type determination unit 220 may be configured to determine a preview type for the content file based at least in part on at least one of the content features analyzed by content feature analysis unit 210, the content information extracted by information extraction unit 230, and the purchase history extracted by information extraction unit 230.

Preview generation unit 240 may be configured to generate a preview of the content file based at least in part on the preview type determined by preview type determination unit 220.

Transmitter 310 may be configured to transmit to a device of the user (e.g., electronic device 110) the preview generated by preview generation unit 240.

Figure 4:
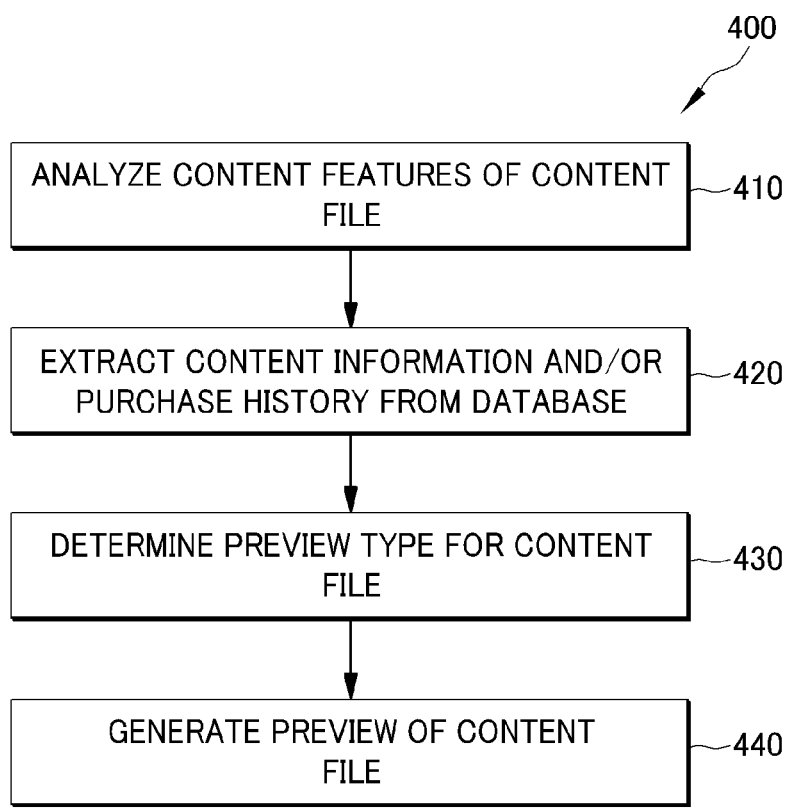
FIG. 4 shows an example flow diagram of a process for providing a dynamic content preview, arranged in accordance with at least some embodiments described herein.

FIG. 4 shows an example flow diagram of a process for providing a dynamic content preview, arranged in accordance with at least some embodiments described herein.

The process in FIG. 4 may be implemented in a content preview system, such as content preview system 200 including content feature analysis unit 210, preview type determination unit 220, information extraction unit 230 and preview generation unit 240 described above; or a content server, such as content server 100 including content preview system 200, database 300 and transmitter 310. An example process 400 may include one or more operations, actions, or functions as illustrated by one or more blocks 410, 420, 430 and/or 440. Although illustrated as discrete blocks, various blocks may be divided into additional blocks, combined into fewer blocks, or eliminated, depending on the desired implementation. Processing may begin at block 410.

At block 410 (Analyze Content Features of Content File), content preview system 200 or content server 100 may analyze one or more content features of a content file. By way of example, but not limitation, when the content file is an electronic book, the content features may indicate at least one of whether the electronic book has a story structure, whether the electronic book has a dictionary-like structure, a ratio between text and images in the electronic book, a ratio between text and tables in the electronic book, and whether the electronic book is a specialty publication. Processing may continue from block 410 to block 420.

At block 420 (Extract Content Information and/or Purchase History from Database), content preview system 200 or content server 100 may extract from a database content information associated with the content file and/or a purchase history of a user. By way of example, but not limitation, the content information may include customer review information regarding the content file and sales information regarding the content file. Processing may continue from block 420 to block 430.

At block 430 (Determine Preview Type for Content File), content preview system 200 or content server 100 may determine a preview type for the content file, as well as an amount of preview to be provided to the user, based at least in part on at least one of the analyzed content features, the extracted content information and the extracted purchase history. By way of example, but not limitation, when the content file is an electronic book, content preview system 200 or content server 100 may select the preview type at least among a preview of a beginning of the electronic book, a preview of a portion of every page of the electronic book, a preview of a portion of sentences in the electronic book, a mosaic view of every page of the electronic book, an embossed view of every page of the electronic book, and a shaded view of every page of the electronic book, based at least in part on the content features. By way of example, but not limitation, content preview system 200 or content server 100 may determine amount of content to preview based at least in part on the content information and/or the purchase history, or alternatively, set the amount of preview as a constant value regardless of the content information and/or the purchase history. Processing may continue from block 430 to block 440.

At block 440 (Generate Preview of Content File), content preview system 200 or content server 100 may generate a preview of the content file based at least in part on the determined preview type and/or amount of content to preview, for transmission to a client device (e.g., electronic device 110) via a content server (e.g., content server 100).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
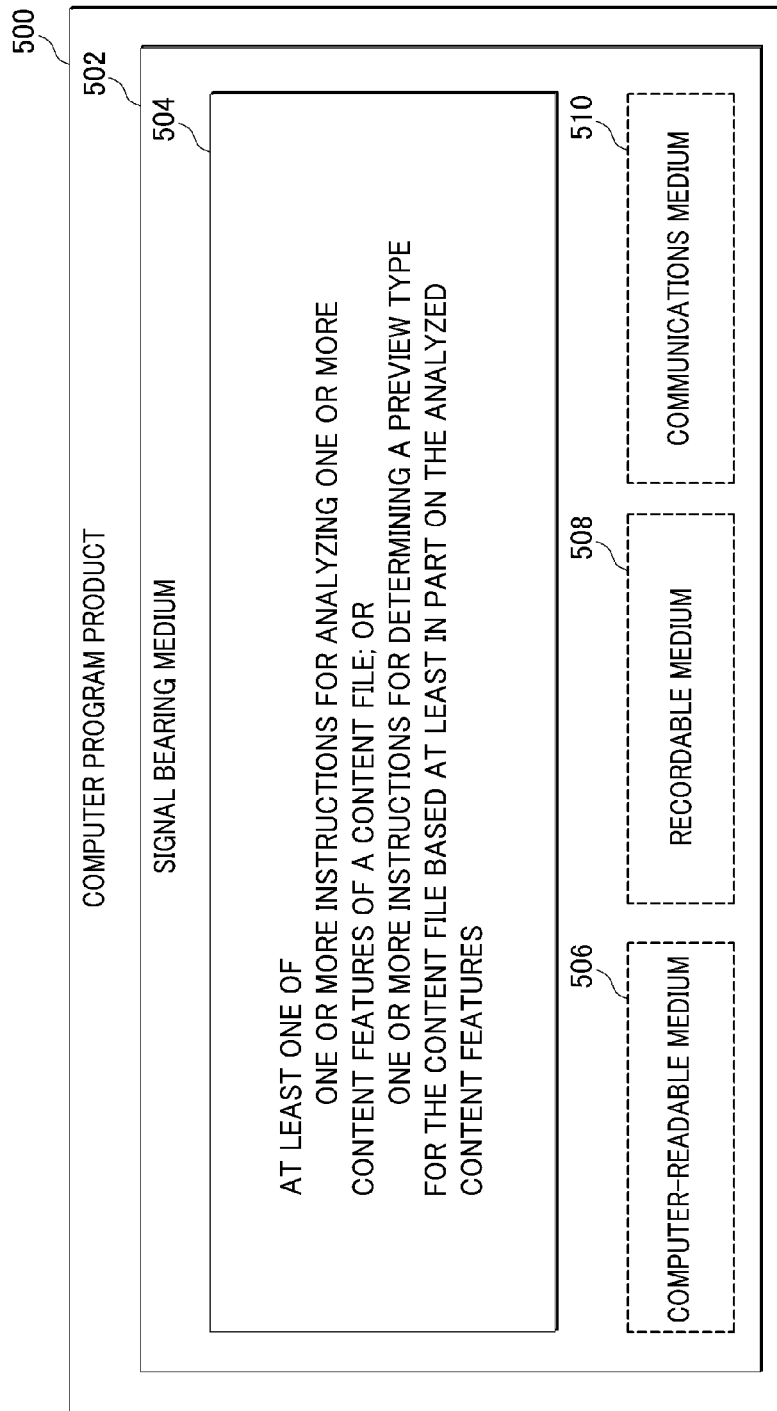
FIG. 5 illustrates an example computer program product that may be utilized to provide a dynamic content preview, arranged in accordance with at least some embodiments described herein.

FIG. 5 illustrates an example computer program product that may be utilized to provide a dynamic content preview, arranged in accordance with at least some embodiments described herein.

Computer program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for analyzing one or more content features of a content file; or one or more instructions for determining a preview type for the content file based at least in part on the analyzed content features. Thus, for example, referring to FIGS. 2-3, content preview system 200 or content server 100 may undertake one or more of the blocks shown in FIG. 4 in response to instructions 504.

In some implementations, signal bearing medium 502 may encompass a computer-readable medium 506, such as, but not limited to, a hard disk drive, a CD, a DVD, a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of content preview system 200 by an RF signal bearing medium 502, where the signal bearing medium 502 is conveyed by a wireless communications medium 510 (e.g., a wireless communications medium conforming with the IEEE 802.11 standard).

Figure 6:
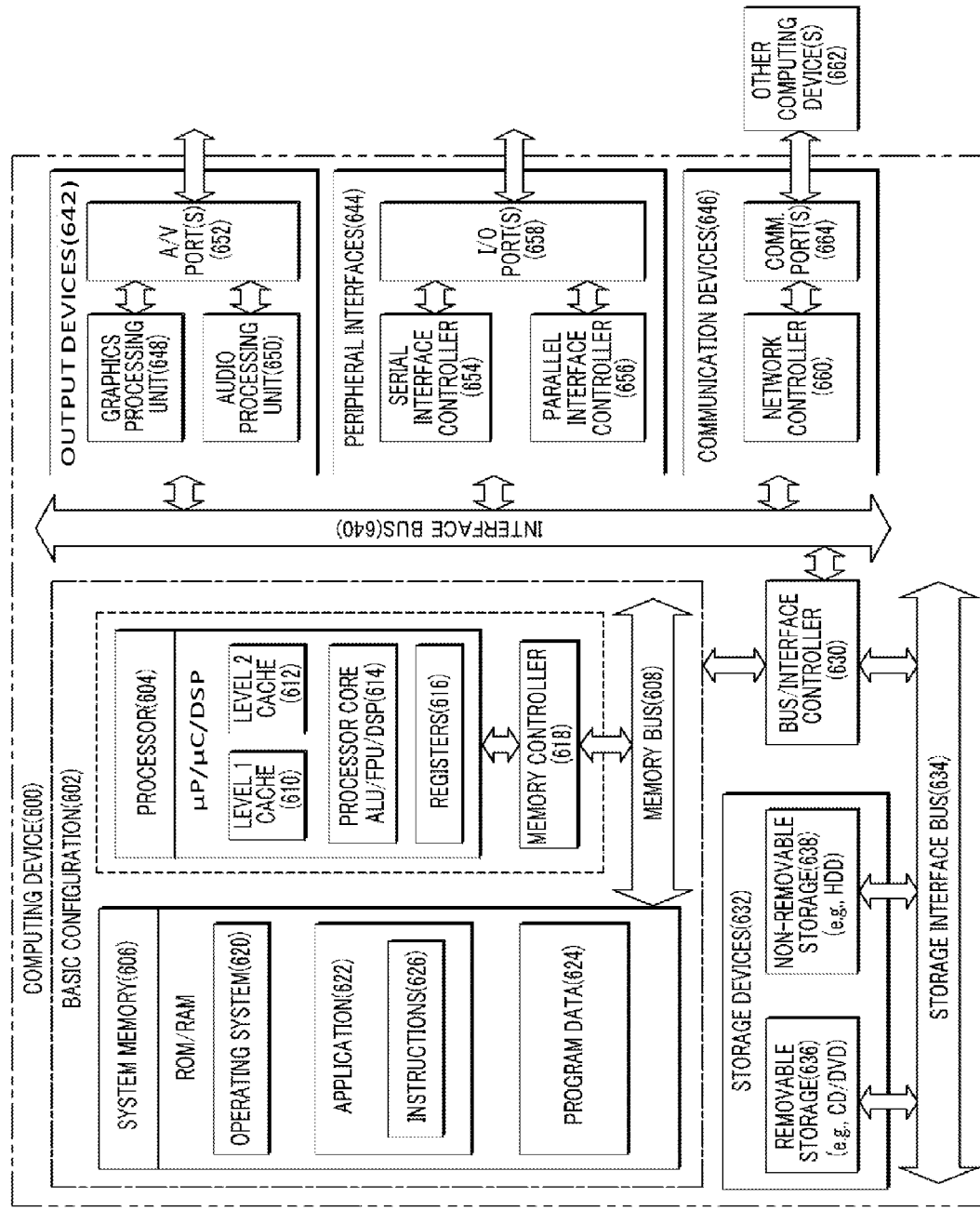
FIG. 6 is a block diagram illustrating an example computing device that may be utilized to provide a dynamic content preview, arranged in accordance with at least some embodiments described herein.

FIG. 6 is a block diagram illustrating an example computing device that may be utilized to provide a dynamic content preview, arranged in accordance with at least some embodiments described herein.

In these examples, elements of computing device 600 may be arranged or configured for a server. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the content preview system 200 architecture as shown in FIG. 2 or including the actions described with respect to the flow charts shown in FIG. 4. In some examples, application 622 may be arranged to operate with program data 624 on an operating system 620 such that implementations for instructions for an electronic device as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A content preview system, comprising:
   a content feature analysis unit to analyze a content file for content features, wherein a weighted presence of respective ones of the content features in the content file is represented by a respective percentage value; and
   a preview type determination unit to:
      determine a relevance of respective candidate preview types to the analyzed content file as a product of at least the respective percentage value and a respective weight value of each of the content features, wherein the weight value of each of the content features corresponds to a respective relationship between the content features and candidate preview types,
      determine which of the respective candidate preview types has a highest relevance to the analyzed content file, and
      select, from among the respective candidate preview types, the preview type having the highest relevance as the preview type for the content file.

2. The content preview system of claim 1, wherein the content file is an electronic book, and
   wherein the content feature analysis unit is further to analyze the electronic book, to:
      determine whether the electronic book has a story structure,
      determine whether the electronic book has a dictionary-like structure,
      calculate a ratio between text and images in the electronic book,
      calculate a ratio between text and tables in the electronic book, and
      determine whether the electronic book is a specialty publication.

3. The content preview system of claim 1, wherein the content file is an electronic book, and
   wherein the content feature analysis unit is further to partition content of the electronic book into words, images and tables.

4. The content preview system of claim 3, wherein the content feature analysis unit is further to detect a frequency of occurrence of technical terms in the electronic book.

5. The content preview system of claim 3, wherein the content feature analysis unit is further to detect change of a frequency of occurrence of a word throughout the electronic book.

6. The content preview system of claim 3, wherein the content feature analysis unit is further to detect a repeated structure throughout the electronic book.

7. The content preview system of claim 1, wherein the content file is an electronic book, and
   wherein the respective candidate preview types include at least one of a preview of a beginning of the electronic book, a preview of a portion of every page of the electronic book, a preview of a portion of sentences in the electronic book, a mosaic view of every page of the electronic book, an embossed view of every page of the electronic book, and a shaded view of every page of the electronic book.

8. The content preview system of claim 1, further comprising:
   an information extraction unit to extract from a database at least one of content information associated with the content file and a purchase history of a user,
   wherein the preview type determination unit is further to determine an amount of a preview of the content file based at least in part on at least one of the content information and the purchase history that are extracted by the information extraction unit.

9. The content preview system of claim 8, wherein the content information includes customer review information regarding the content file and sales information regarding the content file.

10. The content preview system of claim 1, further comprising:
    a preview generation unit to generate a preview of the content file based at least in part on the preview type determined by the preview type determination unit.

11. A content server, comprising:
    a database to store at least one of a content file, content information associated with the content file, and a purchase history of a user;
    a content feature analysis unit to analyze the content file for content features, wherein a weighted presence of respective ones of the content features in the content file is represented by a respective percentage value;
    an information extraction unit to extract from the database at least one of the content information associated with the content file and the purchase history of the user; and
    a preview type determination unit to:
       determine a relevance of respective candidate preview types to the analyzed content file based at least on the respective percentage value and a respective weight value of each of the content features, the content information extracted by the information extraction unit, and the purchase history extracted by the information extraction unit, wherein the weight value of each of the content features corresponds to a respective relationship between the content features and candidate preview types, determine which of the respective candidate preview types has a highest relevance to the analyzed content file, and select, from among the respective candidate preview types, the preview type having the highest relevance as the preview type for the content file.

12. The content server of claim 11, further comprising:
a preview generation unit to generate a preview of the content file based at least in part on the preview type determined by the preview type determination unit.

13. The content server of claim 12, further comprising:
a transmitter to transmit to a device of the user the preview generated by the preview generation unit.

14. A method performed under control of a content preview system, comprising:

analyzing a content file for content features, wherein a weighted presence of respective ones of the content features in the content file is represented by a respective percentage value;

determining a relevance of each of the respective candidate preview types to the content file as a product of at least the respective percentage value and respective weight value of each of content features, wherein the weight value of each of the content features corresponds to a respective relationship between the content features and candidate preview types;

determining which of the respective candidate preview types has a highest relevance to the analyzed content file; and selecting, from among the respective candidate preview types, the preview type having the highest relevance as the preview type for the content file.

15. The method of claim 14, further comprising:
extracting from a database content information associated with the content file,
wherein the determining of the preview type for the content file is further based on the extracted content information.

16. The method of claim 15, wherein the content information includes customer review information regarding the content file and sales information regarding the content file.

17. The method of claim 14, further comprising:
extracting from a database a purchase history of a user,
wherein the determining of the preview type for the content file is further based on the extracted purchase history.

18. The method of claim 14, further comprising:
generating a preview of the content file based at least in part on the determined preview type for transmission to a client device via a content server.

19. The method of claim 14, wherein the content file is an electronic book, and
wherein the content features of the content file include at least one of whether the electronic book has a story structure, whether the electronic book has a dictionary-like structure, a ratio between text and images in the electronic book, a ratio between text and tables in the electronic book, and whether the electronic book is a specialty publication.

20. The method of claim 14, wherein the content file is an electronic book, and
wherein the respective candidate preview types include at least one of a preview of a beginning of the electronic book, a preview of a portion of every page of the electronic book, a preview of a portion of sentences in the electronic book, a mosaic view of every page of the electronic book, an embossed view of every page of the electronic book, and a shaded view of every page of the electronic book.

* * * * *